United States Patent
Yamada et al.

(10) Patent No.: US 7,113,702 B2
(45) Date of Patent: Sep. 26, 2006

(54) WAVELENGTH DIVISION MULTIPLEXING OPTICAL TRANSMISSION SYSTEM AND TRANSMISSION METHOD

(75) Inventors: Eiichi Yamada, Sagamihara (JP); Yuzo Yoshikuni, Tokyo (JP); Hiroaki Sanjoh, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 785 days.

(21) Appl. No.: 10/214,487

(22) Filed: Jul. 31, 2002

(65) Prior Publication Data
US 2003/0030865 A1    Feb. 13, 2003

(30) Foreign Application Priority Data
Aug. 6, 2001    (JP)    ............... 2001-238077
Aug. 6, 2001    (JP)    ............... 2001-238078

(51) Int. Cl.
*H04J 14/02*    (2006.01)

(52) U.S. Cl. ............... 398/79; 398/140; 398/141; 398/158; 398/159; 398/82; 398/84; 398/85; 398/91; 398/182; 398/183; 398/188; 398/192; 398/193; 398/194; 398/202; 398/214; 370/206; 375/260

(58) Field of Classification Search ................ 359/124; 370/206; 375/260; 398/140, 182, 141, 158, 398/159, 183, 91, 188, 192, 193, 194, 202, 398/85, 214, 84, 79
See application file for complete search history.

(56) References Cited

U.S. PATENT DOCUMENTS 5,479,447 A * 12/1995 Chow et al. ............... 375/260
6,556,742 B1   4/2003 Shirasaki 6,747,946 B1 * 6/2004 Kaneko et al. ............. 370/206
2002/0126349 A1 * 9/2002 Sarraf ....................... 359/124

FOREIGN PATENT DOCUMENTS

| JP | 05-160808 | A1 | 6/1993 |
|---|---|---|---|
| JP | 07-33447 | A1 | 12/1995 |
| JP | 2000-151512 | A1 | 5/2000 |
| JP | 2000-224108 | | 8/2000 |
| JP | 2000-295201 | | 10/2000 |
| JP | 2000-352630 | A1 | 12/2000 |
| JP | 2001-127737 | A1 | 5/2001 |

(Continued)

OTHER PUBLICATIONS

Ito, Toshiharu, et al., "3.2 Tb/s—1,500 km WDM transmission experiment using 64 nm hybrid repeated amplifiers", Optical Fiber Communication Conference, US, IEEE, Mar. 7, 2000, vol. 4, PD24-1/239-PD24-3/241.

(Continued)

*Primary Examiner*—Hanh Phan
(74) *Attorney, Agent, or Firm*—Darby & Darby

(57) ABSTRACT

There is provided a WDM optical transmission system and transmission method that have excellent spectral efficiency. The WDM optical transmission system is provided with: an optical transmitting section having an optical transmitter that generates N wave (wherein N is an integer of 2 or greater) optical signals with an optical frequency spacing $\Delta f$ [Hz] and modulated by a modulation bit rate B [bit/s] (wherein $B/\Delta f \leq 1$ [bit/s/Hz]) using a modulation device, and having a coupler that couples the optical signals; an optical receiving section provided with an optical DFT circuit of a sampling frequency $\Delta f$ [Hz] that is equal to the optical frequency spacing; and a bit phase adjustor that makes bit phases of respective wavelength division multiplexed signals synchronous at an input of the optical DFT circuit.

19 Claims, 13 Drawing Sheets

OTHER PUBLICATIONS

Chiba, T., et al., "Wavelength Splitters for DWDM Systems", 2001 Digest of the LEOS Summer Topical Meetings, US, IEEE, Jul. 30, 2001, MD 2.2, pp. 11-12.

Lagali, Neil S., et al., "Analysis of Generalized Mach-Zehnder Interferometers for Variable-Ratio Power Splitting and Optimized Switching", Journal of Lightwave Technology, Dec. 1999, vol. 17, No. 12, pp. 2542-2550.

Li, Yuan P., et al., "*Fourier transform-based optical waveguide filters and WDMs*", *OFC '96* Technical Digest, 1996, pp. 97-98.

Azana, J., et al., "Experimental demonstration of real-time Fourier transformation using linearly chirped fibre Bragg gratings", Electronics Letters, Dec. 9, 1999, vol. 35, No. 25, pp. 2223-2224.

L.O. Lierstuen et al., "8-Channel Wavelength Division Multiplexer Based on Multimode Interference Couplers", IEEE Photonics Technology Letters, vol. 7, No. 9, pp. 1034-1036 (Sep. 1995).

* cited by examiner

BEFORE THE OPTICAL DISCRETE
FOURIER TRANSFORM CIRCUIT

AFTER THE OPTICAL DISCRETE
FOURIER TRANSFORM CIRCUIT

AFTER THE OPTICAL TIME GATE SWITCH

BEFORE THE ASYMMETRIC
MACH-ZEHNDER INTERFERENCE DEVICE

BEFORE THE OPTICAL TIME
GATE SWITCH

AFTER THE OPTICAL TIME GATE SWITCH

WAVELENGTH DIVISION MULTIPLEXING OPTICAL TRANSMISSION SYSTEM AND TRANSMISSION METHOD

BACKGROUND OF THE INVENTION

1. Field of the Invention

The present invention relates to a wavelength division multiplexing (WDM) optical transmission system and transmission method for use in the field of optical communications.

2. Description of the Related Art

Conventionally, a WDM optical transmission system that transmits signals using a plurality of wavelengths is used in order to increase transmission capacity in optical communication.

FIG. 16 is a structural view showing a conventional WDM optical transmission system. In the transmitting section, a wavelength multiplexer 8-1 couples output signals from a plurality of optical transmitters 1-1 having different wavelengths (=optical frequencies). The coupled plurality of optical signals are transmitted using a single common optical transmission medium 1-4. In the receiving section, a wavelength demultiplexer 8-2 demultiplexes received optical signals into optical signals having the respective wavelengths, and a plurality of optical receivers 1-6 receive the optical signals of respective wavelengths. A WDM optical transmission system is achieved using the above structure.

From the standpoint of effective utilization of the optical wavelength bands, dense WDM optical transmission in which the spacings between optical wavelengths are close together is desired. If the optical frequency spacing is taken as $\Delta f$ [Hz] and the transmission speed is taken as B [bit/s], then $B/\Delta f$ [bit/s/Hz] gives what is known as the spectral efficiency. The theoretical limit of the spectral efficiency of a scheme in which ON/OFF modulation (intensity modulation) of double sidebands is performed (namely, a scheme in which double sidebands are generated by ON/OFF modulation) is 1 [bit/s/Hz].

In a conventional WDM optical transmission system, the receiving section extracts the desired optical signal by means of a wavelength selection filter that uses a wavelength demultiplexer such as an arrayed waveguide grating. However, if an attempt is made to transmit a plurality of signals at high density, because the signals of adjacent wavelengths overlap, the problem arises that the wavelength selection filter cannot separate the desired signals. If the wavelength spacings are broadened in order to prevent interference between adjacent wavelengths (adjacent frequencies), the spectral efficiency is reduced. In a conventional WDM optical transmission system, the spectral efficiency is normally approximately 0.4 [bit/s/Hz] or less.

SUMMARY OF THE INVENTION

As described above, if an attempt is made to transmit a plurality of signals at high density, because the signals of adjacent wavelengths overlap, the problem arises that a wavelength selection filter used in a conventional WDM optical transmission system cannot separate the signals. In contrast, if the wavelength spacing is broadened in a conventional WDM optical transmission system, the problem arises that the spectral efficiency is poor. It is therefore an object of the present invention to provide a WDM optical transmission system and transmission method having excellent spectral efficiency.

The WDM optical transmission system of the present invention comprises: an optical transmitting section having an optical transmitter that generates N wave (wherein N is an integer of 2 or greater) optical signals with an optical frequency spacing $\Delta f$ [Hz] and modulated by a modulation bit rate B [bit/s] (wherein $B/\Delta f \leq 1$ [bit/s/Hz]) using a modulation device, and having a coupler that couples the optical signals; an optical receiving section provided with an optical discrete Fourier transform (DFT) circuit that performs a DFT on wavelength division multiplexed signals transmitted from the optical transmitting section at a sampling frequency $\Delta f$ [Hz] that is equal to the optical frequency spacing; and a bit phase adjustor that makes bit phases of respective wavelength division multiplexed signals synchronous at an input terminal of the optical DFT circuit.

The WDM optical transmission system according to another aspect of the present invention comprises: an optical transmitting section that generates N wave (wherein N is an integer of 2 or greater) optical signals with an optical frequency spacing $\Delta f$ [Hz] and modulated by a modulation bit rate B [bit/s] (wherein $B/\Delta f \leq 1$ [bit/s/Hz]) using a modulation device, and couples the optical signals; an optical receiving section provided with: an asymmetrical Mach-Zehnder interference device that takes transmitted signals is $c/(2n_c\Delta f)$ (wherein c is the speed of light, and $n_c$ is an effective refractive index of an optical line); a wavelength filter that selects and transmits a desired wavelength from output signals of the asymmetrical Mach-Zehnder interference device; and a time gate that extracts signals in bit units of a time from $1/(2\Delta f)$ [s] to T[s] (wherein T is the period of one bit) from signals output by the wavelength filter; and a bit phase adjustor that makes bit phases of respective wavelength division multiplexed signals synchronous at an input terminal of the asymmetrical Mach-Zehnder interference device.

The WDM optical transmission method of the present invention comprises the steps of: N wave (wherein N is an integer of 2 or greater) optical signals with an optical frequency spacing $\Delta f$ [Hz] and modulated by a modulation bit rate B [bit/s] (wherein $B/\Delta f \leq 1$ [bit/s/Hz]) using a modulation device are generated, and the optical signals are coupled and transmitted; and the transmitted optical signals are received using an optical DFT circuit that performs a DFT at a sampling frequency $\Delta f$ [Hz] that is equal to the optical frequency spacing, and bit phases are adjusted such that bit phases of respective wavelength division multiplexed signals at an input terminal of the optical DFT circuit are synchronized.

The WDM optical transmission method according to another aspect of the present invention comprises the steps of: N wave (wherein N is an integer of 2 or greater) optical signals with an optical frequency spacing $\Delta f$ [Hz] and modulated by a modulation bit rate B [bit/s] (wherein $B/\Delta f \leq 1$ [bit/s/Hz]) using a modulation device are generated, and the optical signals are coupled and transmitted; bit phase adjustment is performed such that the bit phases of the respective transmitted wavelength division multiplexed signals are synchronized, and the transmitted signals are input into an asymmetrical Mach-Zehnder interference device whose optical path length difference is $c/(2n_c\Delta f)$ (wherein c is the speed of light, and $n_c$ is an effective refractive index of an optical line); a desired wavelength is selected from an output of the asymmetrical Mach-Zehnder interference device; and signals of a time from $1/(2\Delta f)$ [s] to T[s] (wherein T is the period of one bit) are extracted from the selected signals in bit units and the extracted signals are output.

According to the present invention, it is possible to achieve a WDM optical transmission system and transmission method that have excellent spectral efficiency. As a result, in the same wavelength bandwidth as conventional WDM optical transmission system, a WDM optical transmission system having a greater number of wavelengths can be achieved, and it is possible to promote an increase in transmission capacity in optical communication.

In addition, because it is possible to construct an optical transmission line with a narrow bandwidth at a lower cost than an optical transmission line with a wide bandwidth, the present invention allows the cost to be decreased in an optical transmission system in which the cost of constructing the transmission line occupies a large part of the cost of the optical transmission system.

DETAILED DESCRIPTION OF THE PREFERRED EMBODIMENTS

Figure 1:
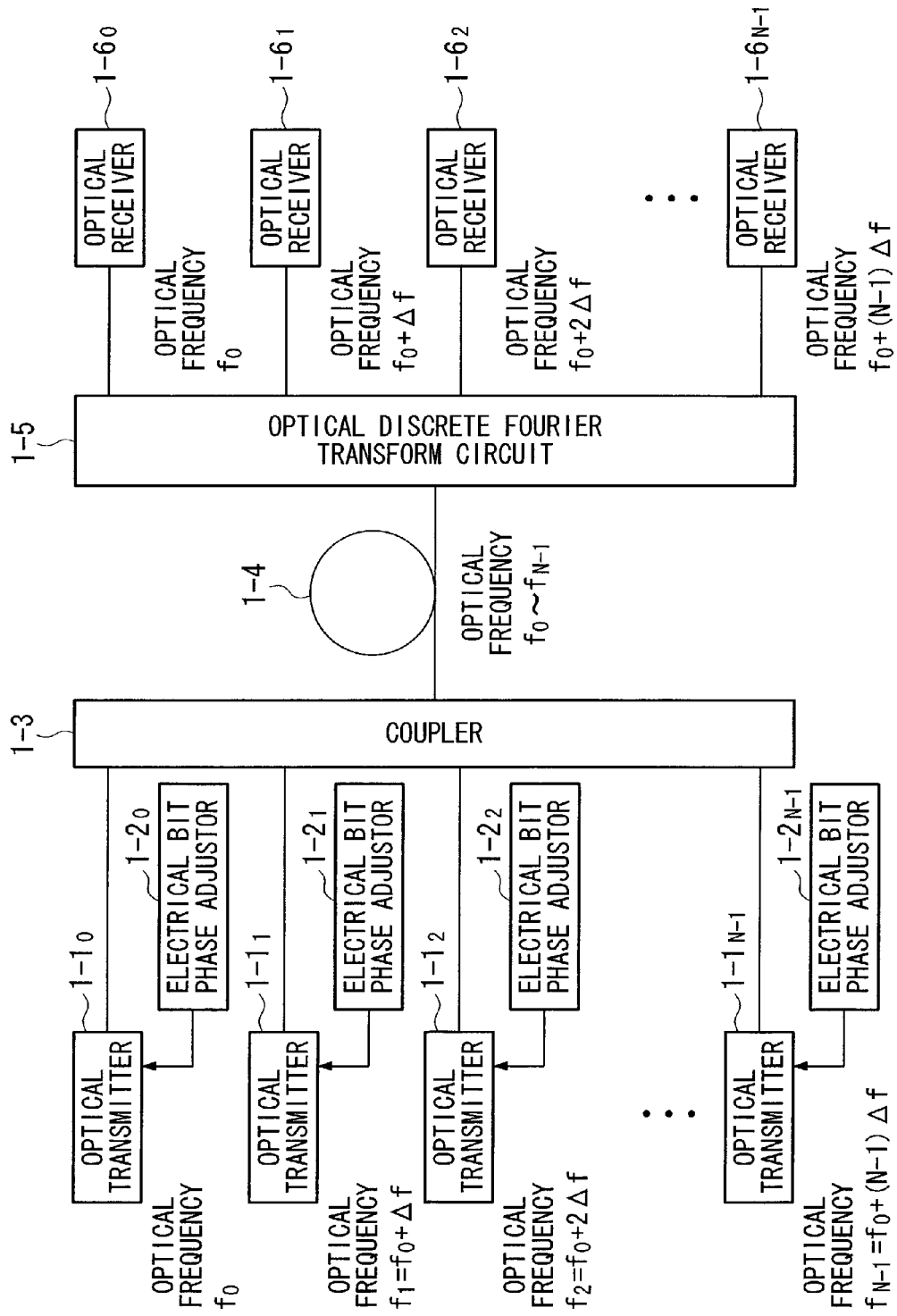
FIG. 1 is a block diagram showing the structure of the WDM optical transmission system according to the first embodiment of the present invention.

The embodiments of the present invention will now be described with reference to the drawings. FIG. 1 shows the structure of the WDM optical transmission system according to the first embodiment of the present invention. In a transmitting section, N number of optical transmitters $1\text{-}1_0$ to $1\text{-}1_{N-1}$ modulate optical signals, which are lined up at an optical frequency spacing $\Delta f$ [Hz], at a modulation bit rate B [bit/s]. The modulation bit rate is set such that the spectral efficiency $B/\Delta f$ [bit/s/Hz] is a value not greater than 1 and close to 1. Namely, each optical transmitter $1\text{-}1_0$ to $1\text{-}1_{N-1}$ generates optical signals at an optical frequency of $f_0$, $f_1=f_0+\Delta f$, $f_2=f_0+2\Delta f$, ..., $f_{N-1}=f_0+(N-1)\Delta f$, and also modulates each of these optical signals at the modulation bit rate B.

The optical transmitters $1\text{-}1_0$ to $1\text{-}1_{N-1}$ are able to control the bit phases of electrical modulation signals supplied to a modulation device (not shown) provided inside each optical transmitter using electrical bit phase adjustors $1\text{-}2_0$ to $1\text{-}2_{N-1}$. The bit phases of the electrical signals are adjusted using a phase shifter or the like such that the bit phases of the signals of all of the optical frequencies (=wavelengths) are synchronized at the input terminal of the optical DFT circuit 1-5 in order to enable signal processing to be performed on one particular bit. In the final stage of the transmitting section, a coupler 1-3 couples optical signals from the N number of optical transmitters, and the coupled optical signals are simultaneously transmitted over a single optical transmission medium 1-4.

Here, a description is given of when separation into the respective wavelengths can be realized by using an optical DFT circuit having the sampling frequency $\Delta f$ when the optical frequencies of the optical signals are lined up at an equal optical frequency spacing $\Delta f$ [Hz].

After the wavelength division multiplexed signals have been transmitted over the optical transmission medium 1-4, in the optical receiving section, the optical DFT circuit 1-5 undergoes DFT at the sampling frequency $\Delta f$, and outputs the results of the Fourier transform from N number of output terminals. The results of the DFT output from the N number of output terminals are coefficients respectively of the frequencies 0, $\Delta f$, $2\Delta f$, ..., $(N-1)\Delta f$, and because the optical frequencies of the transmitters $1\text{-}1_0$ to $1\text{-}1_{N-1}$ also have differences of 0, $\Delta f$, $2\Delta f$, ..., $(N-1)\Delta f$ relative to the reference optical frequency $f_0$, it can be seen that the signal components of each optical frequency (wavelength) are obtained by the optical DFT circuit. Namely, the optical DFT circuit acts as an optical frequency separating circuit.

Optical receivers $1\text{-}6_0$ to $1\text{-}6_{N-1}$ receive the optical signals separated into the respective wavelengths, enabling dense WDM optical transmission to be achieved.

Viewed from the output terminals of the optical DFT circuit 1-5, all of the frequency components other than the desired ones are cancelled out by the Fourier transformation. Namely, the input optical frequency components are orthogonal to each other. Accordingly, taking the name of a similar wireless communication system, it is possible to give the name of optical orthogonal frequency division multiplexing transmission system (optical OFDM transmission system) to the WDM optical transmission system of the present invention.

Figure 2:
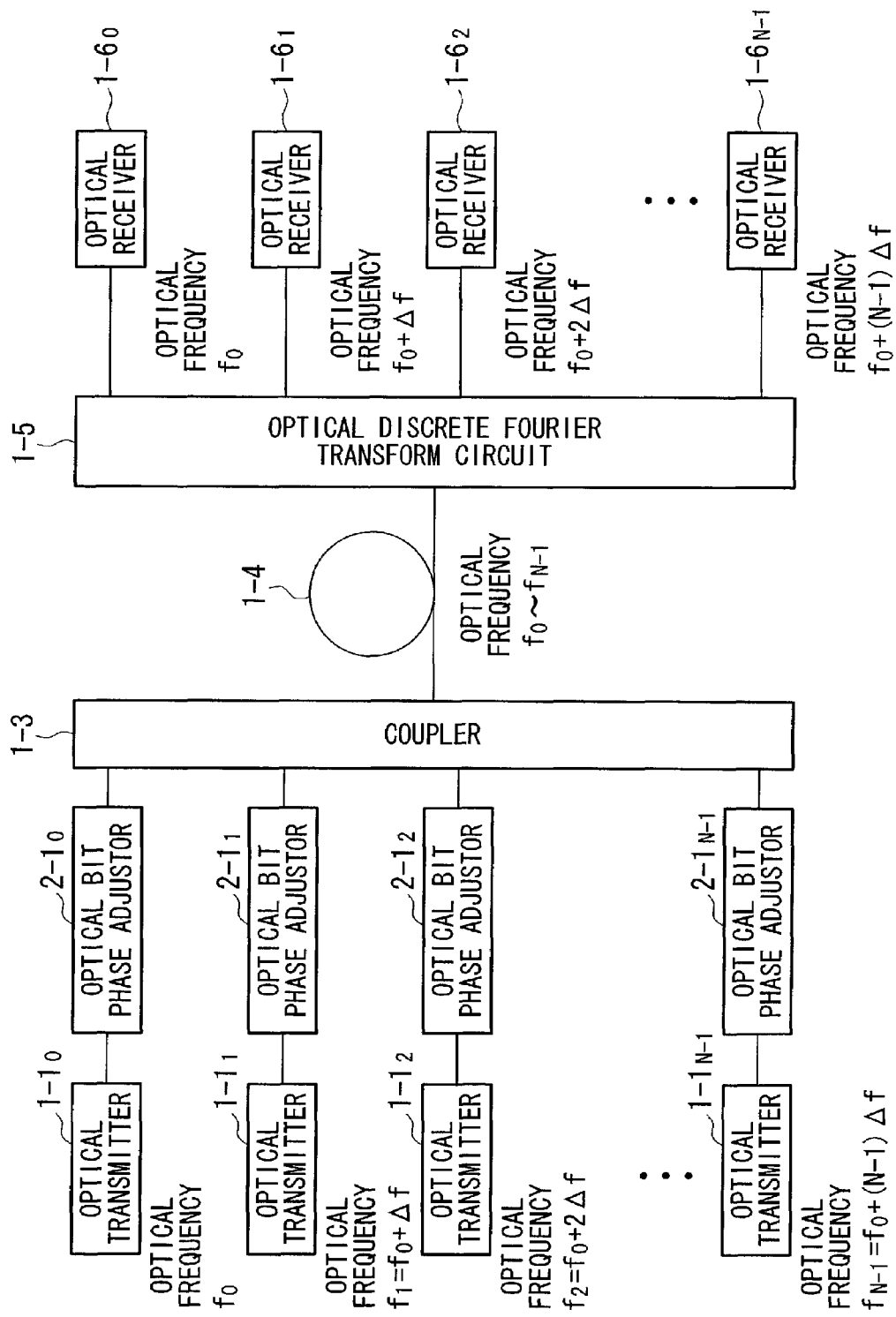
FIG. 2 is a block diagram showing the structure of the WDM optical transmission system according to the second embodiment of the present invention.

FIG. 2 shows the WDM optical transmission system according to the second embodiment of the present invention. Here, the same reference symbols are given to components corresponding to those in FIG. 1 (this also applies to the embodiments below). The difference between this embodiment and the first embodiment lies in the bit phase adjustor being different. In the present embodiment, optical bit phase adjustors $2\text{-}1_0$ to $2\text{-}1_{N-1}$, such as variable delay lines provided between the respective outputs of the optical transmitters $1\text{-}1_0$ to $1\text{-}1_{N-1}$ and the coupler 1-3 are used as bit phase adjustors, and the optical path lengths are adjusted so that bit phases of signals over all of the wavelengths at the input terminal of the optical DFT circuit 1-5 are synchronized.

In FIG. 2, optical bit phase adjustors are provided in the transmitting section, however, it is also possible to provide optical bit phase adjustors formed by devices such as chromatic dispersion media whose optical path lengths vary in accordance with the wavelength at an arbitrary point on the optical transmission medium 1-4 between the optical transmitting section and the optical receiving section, and to make the bit phases of respective wavelengths synchronous.

Figure 3:
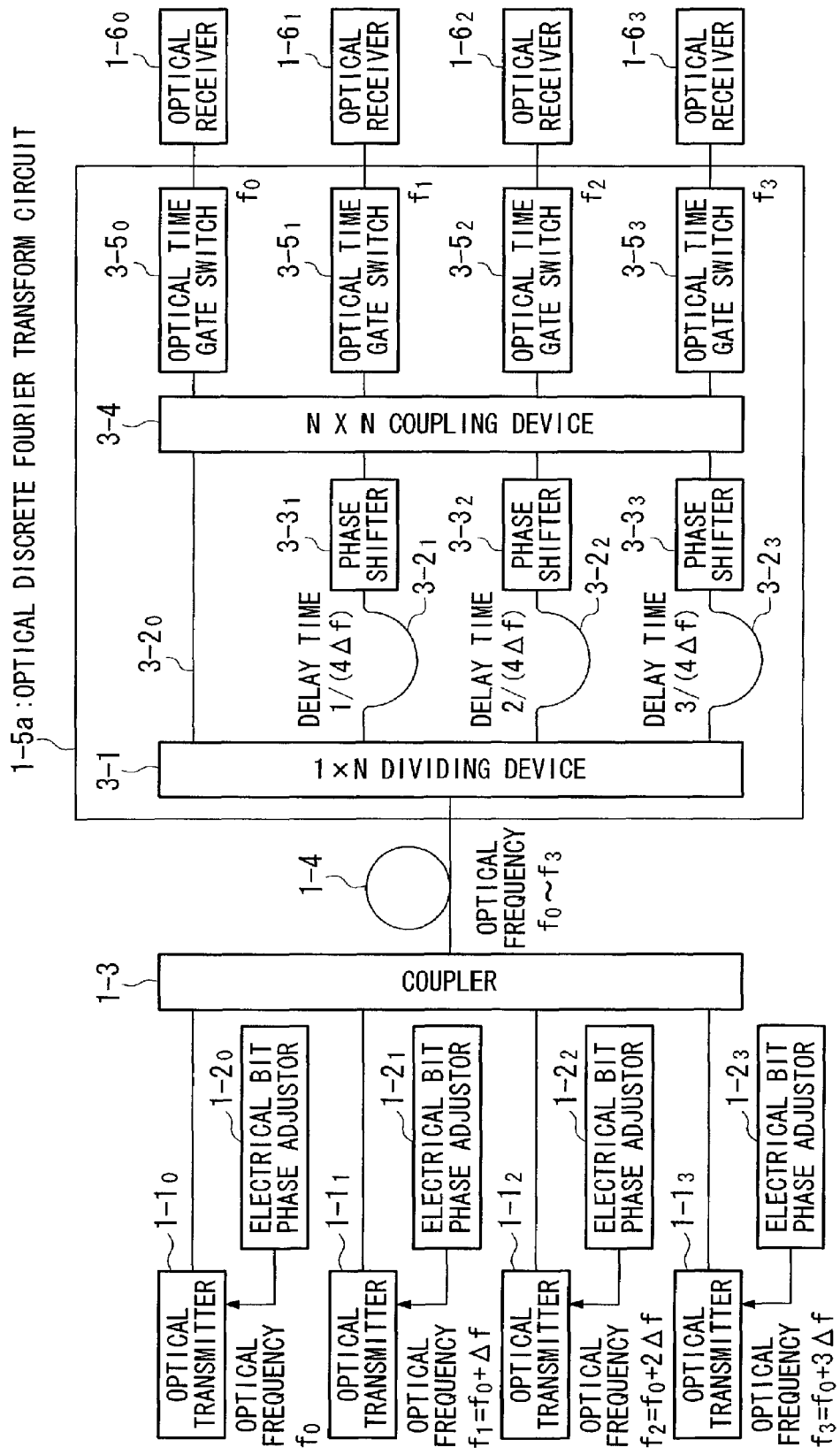
FIG. 3 is a block diagram showing the structure of the WDM optical transmission system according to the third embodiment of the present invention.

FIG. 3 shows the WDM optical transmission system according to the third embodiment of the present invention. FIG. 3 shows a specific example of the optical DFT circuit 1-5 (referred to as the optical DFT circuit 1-5a) described with reference to FIGS. 1 and 2. In FIG. 3, a case is shown of when the number of wavelengths is 4. The structure and operation of this embodiment will now be described using the figures. Because the transmitting section is the same as that in the first embodiment of the present invention, a description of the structure and operation thereof is omitted here.

The optical DFT circuit 1-5a of the receiving section is formed by a 1×N dividing device 3-1, N number of optical delay lines $3\text{-}2_0$ to $3\text{-}2_3$, an N×N coupling device 3-4, and optical time gate switches $3\text{-}5_0$ to $3\text{-}5_3$. An explanation of why this structure forms an optical DFT circuit is given below, firstly, the operation of each component will be described.

The 1×N dividing device 3-1 divides wavelength division multiplexed signals that have been transmitted over the optical transmission medium 1-4 into N branches. The optical path lengths of the optical delay lines $3\text{-}2_0$ to $3\text{-}2_3$ are different from each other by $\Delta L = c/(Nn_c\Delta f)$ (wherein c is the speed of light, and nc is the effective refractive index of the optical delay line), and the divided signals are delayed respectively by the times $0, 1/N/\Delta f, 2/N/\Delta f, \ldots, (N-1)/N/\Delta f$ taking the shortest optical line as a reference. Taking the signals output respectively from the optical delay lines to the N×N coupling device 3-4 as $Ein_k$ (where $k = 0 \ldots N-1$), the N×N coupling device 3-4 couples these signals in accordance with a phase relationship determined by the equation below, and outputs the coupled signals to the N number of terminals:

$$E_{out_l} = \sum_{k=0}^{N-1} e^{-j\frac{2\pi}{N}k \cdot l} \cdot E_{in_k} \quad (l = 0 \ldots N-1) \quad \text{Equation (1)}$$

Generally, an optical path length difference on the order of a wavelength or less corresponds to the phase difference. The phase shifters $3\text{-}3_1$ to $3\text{-}3_{N-3}$ are used to adjust errors in the optical path length occurring during production. If errors in the optical path length occurring during production are small enough, then it is possible to omit the phase shifters $3\text{-}3_1$ to $3\text{-}3_3$ by controlling the optical path length differences in the optical delay lines to precisions that are sufficiently small as compared with a wavelength according to Equation (1). This fact also applies to the phase shifters used in the other embodiments. In Equation (1), the sign for the phase term $$\left(e^{-j\frac{2\pi}{N}k \cdot l}\right)$$

is a minus sign in order to match the mathematical explanation given below, however, it may be either a plus sign or a minus sign in order to achieve the present invention.

More specifically, the 1×N dividing device 3-1 can be achieved by various means that directly divide light into N branches such as a multi-mode interference 1×N dividing device or a 1×N star coupler, or by various means that divide light into N branches using multistage connections such as a multistage connection of 1×2 couplers.

Figure 4:
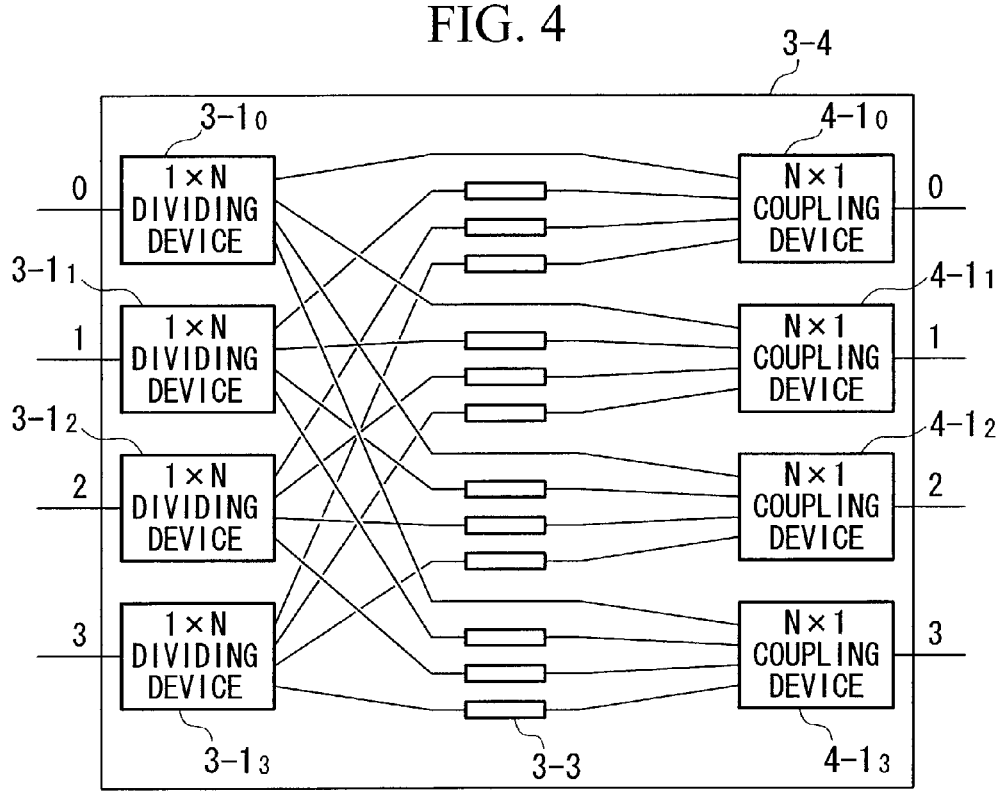
FIG. 4 is a block diagram showing an example of the structure of the N×N coupling device 3-4 shown in FIG. 3.

More specifically, the N×N coupling device 3-4 can be structured in the manner shown in FIG. 4. In FIG. 4, the outputs of N number (in this case, N=4) of optical delay lines are divided respectively by the 1×N dividing devices $3\text{-}1_0$ to $3\text{-}1_3$, and are then coupled by the N number of N×1 coupling devices $4\text{-}1_0$ to $4\text{-}1_3$ (achieved by devices in which the inputs and outputs are the reverse of the 1×N dividing devices) via the phase shifters 3-3 used for phase adjustment. When the N×N coupling device 3-4 is to be achieved using a single device, it can be achieved by various means that couple the outputs of the N number of optical delay lines in accordance with the phase relationship of Equation (1) such as a multi-mode interference N×N coupling device. If a multi-mode interference N×N coupling device is used, it is necessary to correct the phase term of the Equation (1) while considering the phase changes inside the multi-mode interference coupling device. The correction values for this can be found using the method described in the paper "8-Channel Wavelength Division Multiplexer Based on Multimode Interference Couplers", L. O. Lierstuen et al., IEEE Photonics Technology Letters, Vol. 7, No. 9, pp. 1034–1036, (September, 1995).

Furthermore, taking the signal with the shortest delay as a reference, the optical time gate switches $3\text{-}5_0$ to $3\text{-}5_3$ extract signals in the time $(N-1)/N/\Delta f$ to T (wherein T is the period of one bit) from the optical signals output through the N number of output terminals of the N×N coupling device 3-4, and thus the respective wavelengths (=optical frequencies) are separated.

As stated above, because signal components of each optical frequency (=wavelength) are obtained by an optical DFT circuit, the optical receivers $1\text{-}6_0$ to $1\text{-}6_3$ receive signals separated into the respective wavelengths, and dense WDM optical transmission is achieved.

Using the equation given below, a description will now be given of when an optical circuit formed from a 1×N dividing device 3-1, N number of optical delay lines $3\text{-}2_0$ to $3\text{-}2_3$, phase shifters $3\text{-}3_1$ to $3\text{-}3_3$, an N×N coupling device 3-4, and optical time gate switches $3\text{-}5_0$ to $3\text{-}5_3$ performs the operations of the optical DFT circuit.

Looking at one particular bit, if it is determined that a sampling is made with the time spacing $\Delta t = 1/N/\Delta f$, and the k-th sampled value is taken as $x_k = x(k\Delta t)$, then the discrete Fourier spectrum $X_l = X(l\Delta\omega)$ (wherein $\Delta\omega = 2\pi\Delta f$) is expressed by the DFT formula given below.

$$X_l = \sum_{k=0}^{N-1} x_k \cdot e^{-jl\Delta\omega k\Delta t} \Delta t = \qquad \text{Equation (2)}$$

$$\sum_{k=0}^{N-1} x\left(\frac{k}{N\Delta f}\right) \frac{1}{N\Delta f} \cdot e^{-j\frac{2\pi}{N}lk} \quad (l = 0 \ldots N-1)$$

Comparing Equation (1) with Equation (2) shows that the outputs of the N×N coupling device that couples signals x (k/(NΔf)) that are respectively delayed by the times 0, 1/N/Δf, 2/N/Δf, . . . , (N−1)/N/Δf in accordance with a phase relationship such as that determined by Equation (1) indicates the result of a DFT.

Figure 5:
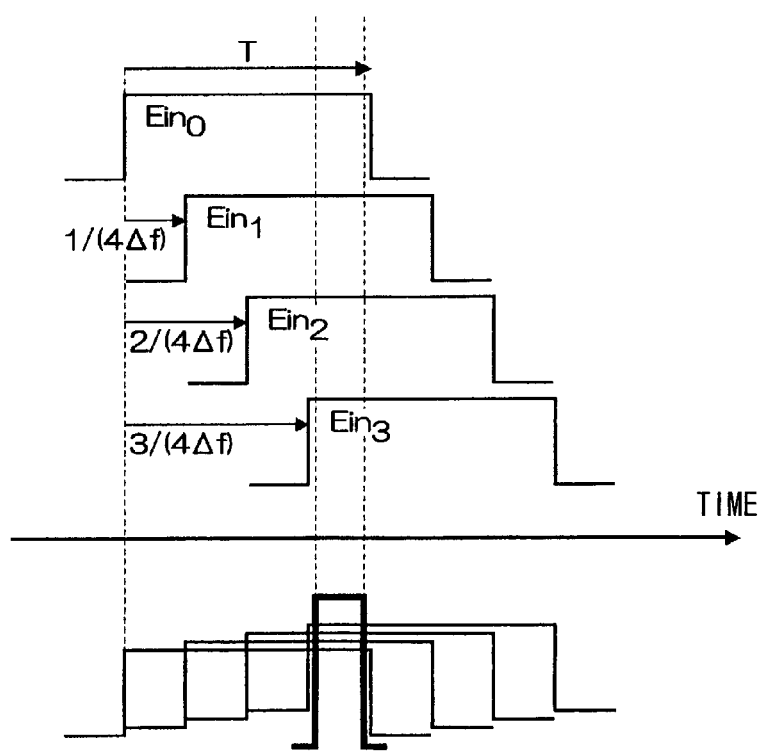
FIG. 5 is a waveform diagram for explaining the operation of the optical time gate switches $3\text{-}5_0$ to $3\text{-}5_3$ shown in FIG. 3.

In order to extract the coupled component only of the one particular bit under study, it is necessary to extract signals of the times (N−1)/N/Δf to T using the optical time gate switches. A description will now be given of the operation of the optical time gate switches $3\text{-}5_0$ to $3\text{-}5_3$ from among the operations performed by the optical DFT circuit 1-5a with reference to FIG. 5. Looking at one particular bit, the outputs Eink (k=0 . . . 3) of the optical delay lines are respectively delayed in the manner shown in FIG. 5. If these are coupled, it can be understood that only the 3/(4Δf) to T time portion undergoes all of the $\text{Ein}_k$ couplings. Because only this time portion shows the result of the Equation (2), if the signals of the time 3/(4Δf) to T are extracted using the optical time gate switches then the Eink coupled components are extracted and an optical DFT is achieved.

In the third embodiment, the optical time gate switches $3\text{-}5_0$ to $3\text{-}5_3$ are used as time gates. The optical time gate switches can be achieved, for example, by all-optical switches that use an optical nonlinear effect or by ones that use electroabsorption modulators or Mach-Zehnder intensity modulators as switches.

Figure 6:
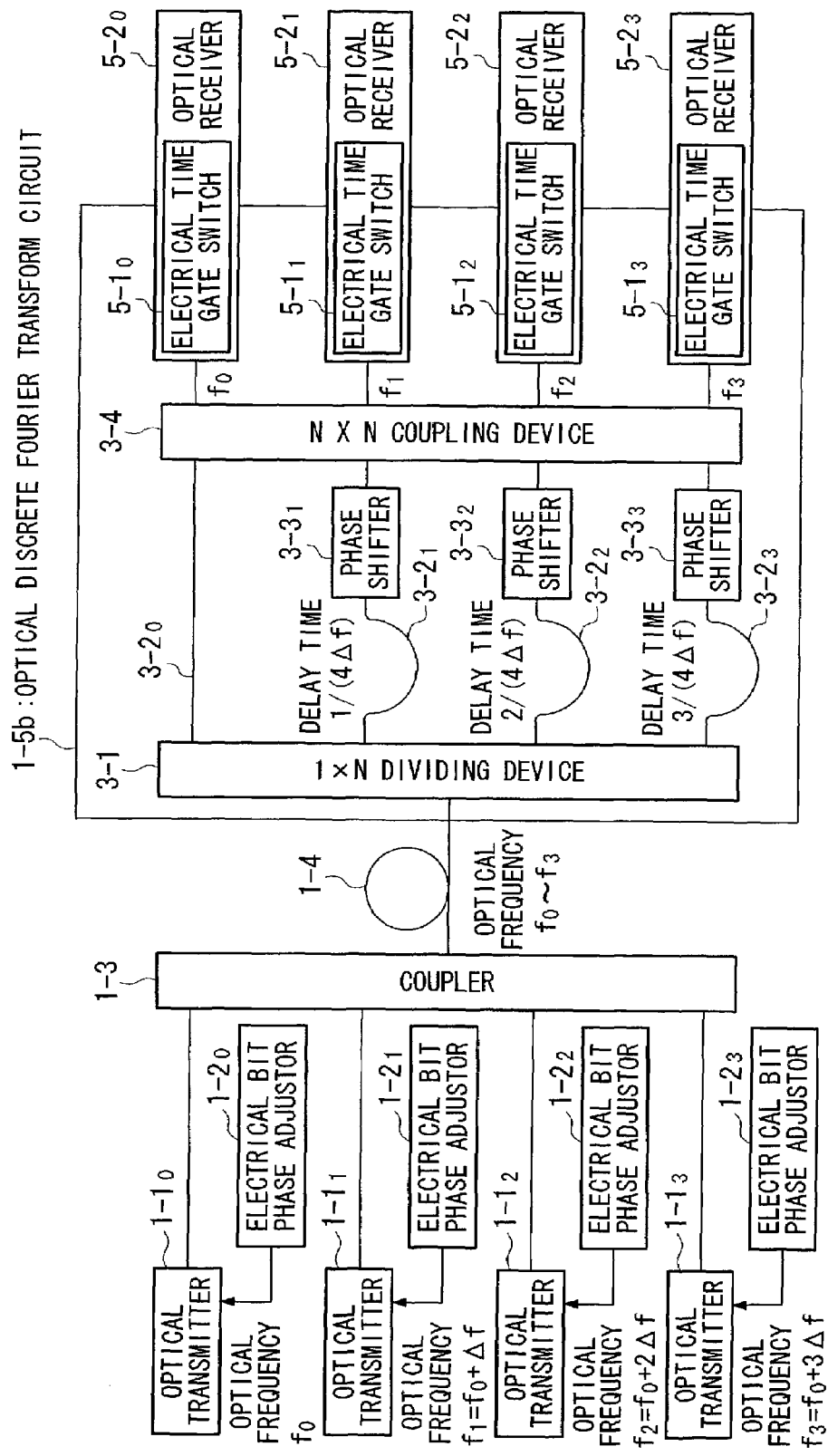
FIG. 6 is a block diagram showing the structure of the WDM optical transmission system according to the fourth embodiment of the present invention.

Alternatively, as is the case in the fourth embodiment of the present invention shown in FIG. 6, the same effect can be achieved using electrical time gate switches $5\text{-}1_0$ to $5\text{-}1_3$ such as by a method in which, after optical signals output from the N×N coupling device 3-4 have been respectively converted into electrical signals using the optical receivers $5\text{-}2_0$ to $5\text{-}2_3$, electrical signals in the time (N−1)/N/Δf to T are extracted by, for example, adjusting the decision timing of a decision circuit. Namely, in the optical DFT circuit 1-5b shown in FIG. 6, the optical time gate switches $3\text{-}5_0$ to $3\text{-}5_3$ in the optical DFT circuit 1-5a shown in FIG. 3 are omitted, and the electrical time gate switches $5\text{-}1_0$ to $5\text{-}1_3$ are provided in the optical receivers $5\text{-}2_0$ to $5\text{-}2_3$ that correspond to the optical receivers $1\text{-}6_0$ to $1\text{-}6_3$.

Figure 7:
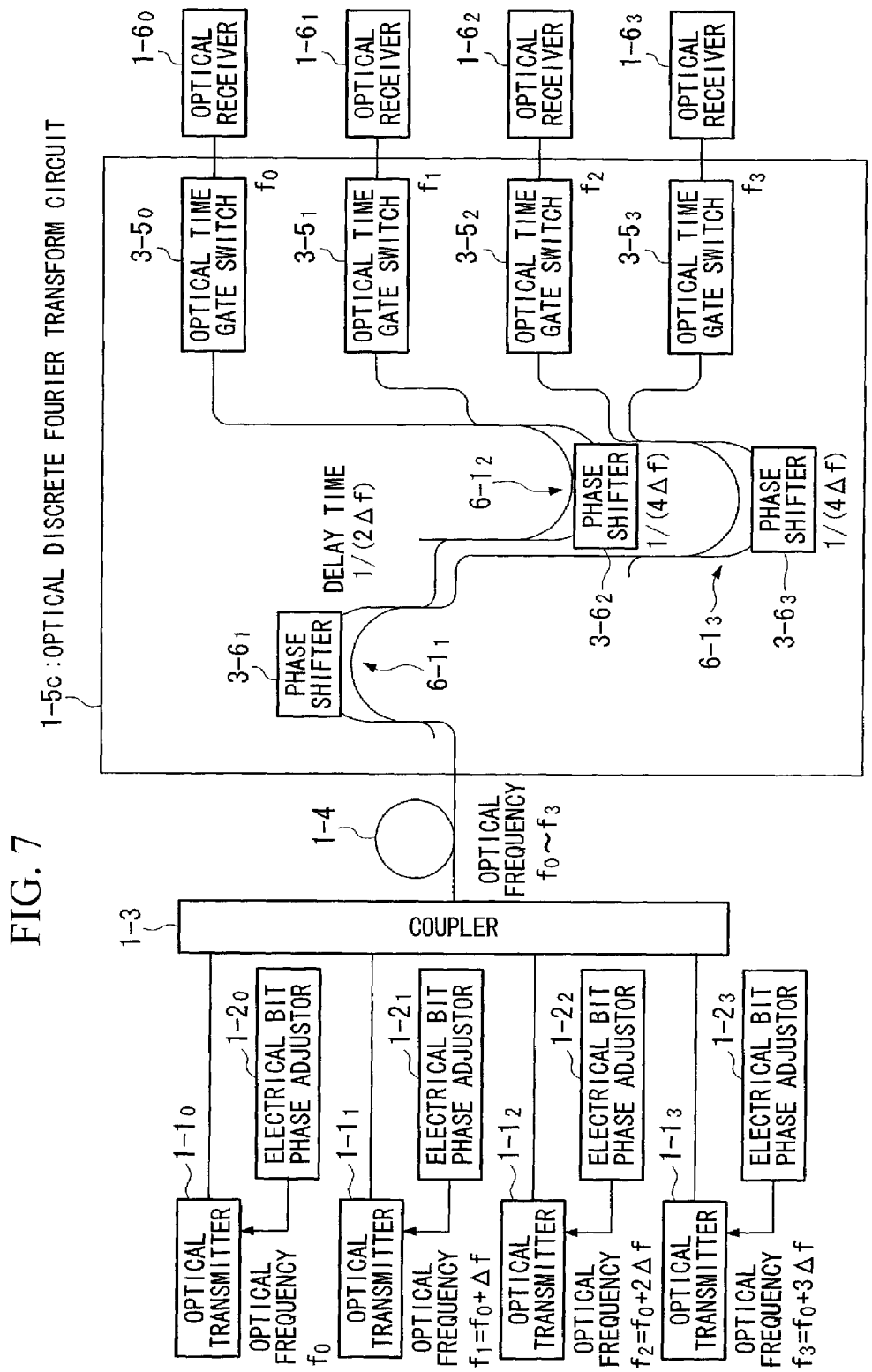
FIG. 7 is a block diagram showing the structure of the WDM optical transmission system according to the fifth embodiment of the present invention.

FIG. 7 shows the WDM optical transmission system according to the fifth embodiment of the present invention. In the present embodiment, a different specific example of the optical DFT circuit 1-5 (referred to as the optical DFT circuit 1-5c) is shown. In FIG. 7, a description is given of when the number of wavelengths N=4.

The structure and operation of this embodiment will now be described with reference to the figures. Portions other than the optical DFT circuit are the same as those in the first and third embodiments and therefore only the optical DFT circuit 1-5c is described here.

An integer m is selected such that $2^m \geq N$, and $\Delta L = c/(2^m n_c \Delta f)$ is set (wherein c is the speed of light, and $n_c$ is the effective refractive index of the optical delay line). In the optical DFT circuit 1-5c, wavelength division multiplexed signals (frequency division multiplexed signals) are firstly coupled by an asymmetrical Mach-Zehnder interference device $6\text{-}1_1$ with a $2^{m-1}$ Δf optical path length difference, namely, a 1/2/Δf delay time difference. At this time, the phase shifter $3\text{-}6_1$ is adjusted so that one of the signal wavelengths matches the peak of the transmitted spectrum of the asymmetrical Mach-Zehnder interference device $6\text{-}1_1$. The respective outputs from the asymmetrical Mach-Zehnder interference device $6\text{-}1_1$ are joined to the subsequent asymmetrical Mach-Zehnder interference devices $6\text{-}1_2$ to $6\text{-}1_3$, and are further coupled with a $2^{m-2}\Delta L$ optical path length difference, namely, a 1/4/Δf delay time difference. At this time, the phase shifters $3\text{-}6_2$ to $3\text{-}6_3$ are adjusted so that the signal wavelength peaks match the peaks of the transmitted spectra of the asymmetrical Mach-Zehnder interference devices $6\text{-}1_2$ to $6\text{-}1_3$.

These steps are repeated m number of times, and are finally coupled by $2^{m-1}$ number of asymmetrical Mach-Zehnder interference devices with a ΔL optical path length difference, namely, a 1/N/Δf delay time difference, thereby providing $2^m$ number of outputs. At this time, the $2^m$ number of phase shifters are adjusted so that the signal wavelength peaks match the peaks of the transmitted spectra of the asymmetrical Mach-Zehnder interference devices. By employing a structure such as this, $2^m$ number of output signals whose respective optical path lengths differ by the amount ΔL are coupled in accordance with the phase relationship in Equation (1).

Here, a description has been given of when the order in which the asymmetrical Mach-Zehnder interference devices are joined is from the largest delay time difference, however, the joining order is arbitrary and the devices may be joined in any order.

Taking the signal with the shortest delay as a reference, the optical time gate switches $3\text{-}5_0$ to $3\text{-}5_3$ extract signals in the time $(2^m-1)/2^m/\Delta f$ to T from optical signals output from each of the $2^m$ number of terminals. An optical DFT is achieved using the above structure.

Figure 8:
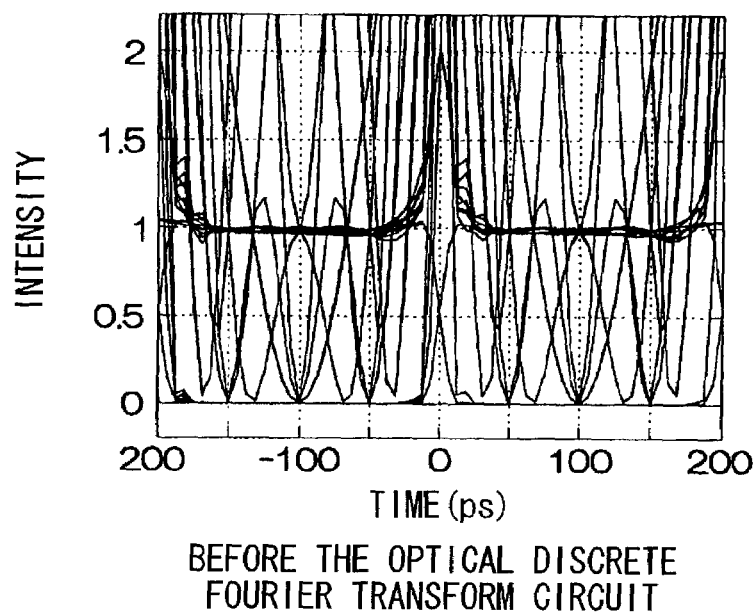
FIG. 8 is an eye diagram (i.e. a waveform before the optical DFT circuit 1-5a) showing a simulation result according to the third embodiment of the present invention.
Figure 9:
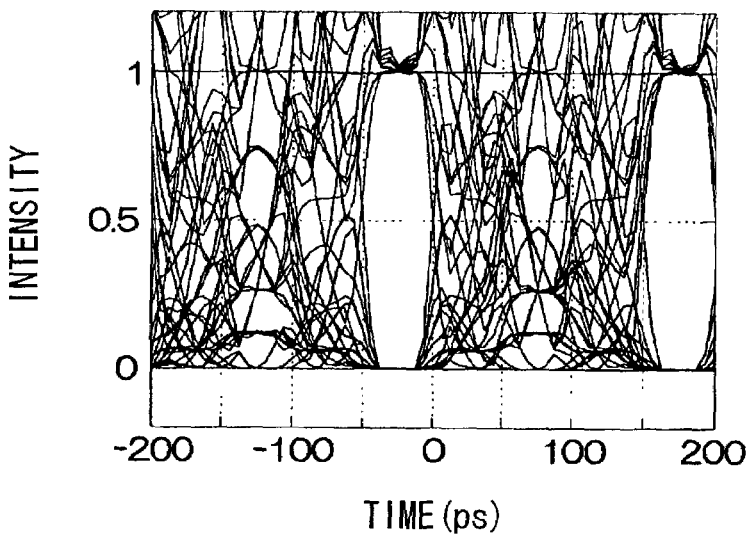
FIG. 9 is an eye diagram (i.e. a waveform after the optical DFT circuit 1-5a) showing a simulation result according to the third embodiment of the present invention.
Figure 10:
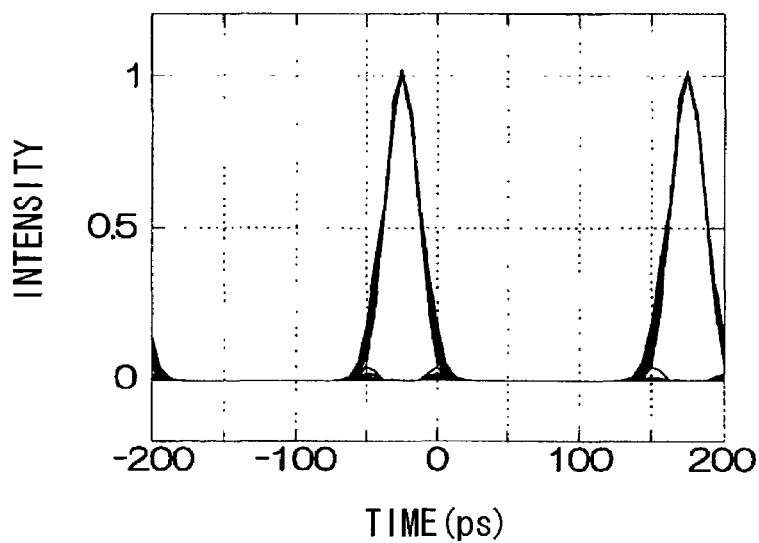
FIG. 10 is an eye diagram (i.e. a waveform after the optical time gate switches $3\text{-}5_0$ to $3\text{-}5_3$) showing a simulation result according to the third embodiment of the present invention.

FIGS. 8 to 10 show the results of simulations using the structure of the third embodiment of the present invention. The optical frequency (wavelength) spacing is taken as 5 [GHz], the bit rate as 5 [Gb/s], and N=4. The spectral efficiency is 1 [bit/s/Hz]. Eye diagrams of before and after the optical DFT circuit as well as after the optical time gate switches are shown respectively in FIGS. 8 to 10. As shown in FIG. 10, it can be seen that a sufficient eye diagram is opened. Thus, the present embodiment provides a WDM optical transmission system that has excellent spectral efficiency.

Figure 11:
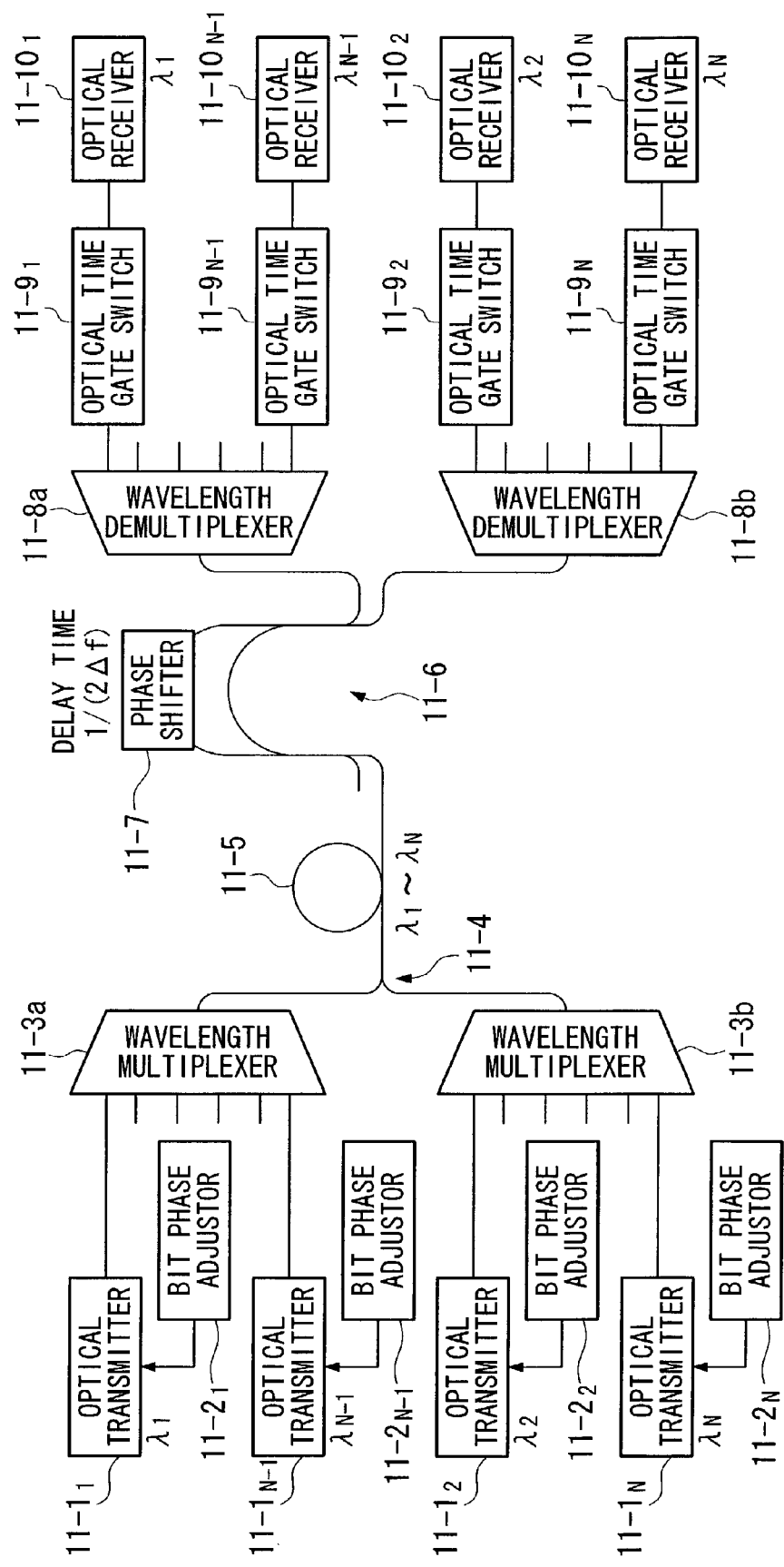
FIG. 11 is a block diagram showing the structure of the WDM optical transmission system according to the sixth embodiment of the present invention.

FIG. 11 shows the structure of the WDM optical transmission system according to the sixth embodiment of the present invention.

In the transmitting section, N (wherein N is an integer of 2 or greater, although in order to simplify the assignment of reference symbols, in the present embodiment N is an even number) number of optical transmitters $11\text{-}1_1$ to $11\text{-}1_N$ that are lined up at an optical frequency spacing Δf [Hz], each modulate optical signals having the respective wavelengths $\lambda_1$ to $\lambda_N$ at a modulation bit rate B [bit/s], and the modulation bit rate is set such that the spectral efficiency B/Δf [bit/s/Hz] is a value not greater than 1 and close to 1. The modulation scheme is an ON/OFF modulation scheme.

The optical transmitters $11\text{-}1_1$ to $11\text{-}1_N$ are able to control the bit phases of electrical modulation signals supplied to a modulation device (not shown) provided inside each optical transmitter $11\text{-}1_1$ to $11\text{-}1_N$ using electrical bit phase adjustors $11\text{-}2_1$ to $11\text{-}2_N$. The bit phases of the electrical signals are adjusted such that the bit phases of the signals of all of the optical wavelengths are synchronized at the input terminal of the asymmetrical Mach-Zehnder interference device 11-6 of the receiving section such that signal processing can be performed on one particular bit. Alternatively, in order to realize a bit phase adjustor, it is also possible to provide an optical bit phase adjustor such as a variable optical delay line between the optical transmitters $11\text{-}1_1$ to $11\text{-}1_N$ and the wavelength multiplexers 11-3a and 11-3b, and to make the bit phases of signals of all the wavelengths synchronous at the input terminal of the asymmetrical Mach-Zehnder interference device 11-6 of the receiving section by adjusting the optical path lengths.

In the present embodiment, because the spectral efficiency B/Δf [bit/s/Hz] is set to a value not greater than 1 and close to 1, the wavelength spacing is narrowed to approximately the same as the signal bandwidth. Therefore, if coupling is performed using a conventional wavelength multiplexer in the transmitting section, the signal components are reduced during the wavelength coupling. Therefore, in order to avoid this in the present embodiment, when coupling is performed using a wavelength multiplexer, a plurality of optical signals of odd-numbered channels lined up at an optical frequency spacing 2Δf (i.e., optical signals of the optical signal wavelengths $\lambda_1, \lambda_3, \lambda_5, \ldots, \lambda_{N-1}$) are coupled by a wavelength multiplexer 11-3a of the optical frequency spacing 2Δf, while a plurality of optical signals of even-numbered channels (i.e., optical signals of the optical signal wavelengths $\lambda_2, \lambda_4, \lambda_6, \ldots, \lambda_N$) are coupled by a different wavelength multiplexer 11-3b of the optical frequency spacing 2Δf. The outputs of the two wavelength multiplexers are then coupled by a 1:1 coupler 11-4 or the like. Because the optical frequency spacings 2Δf of the wavelength multiplexers 11-3a and 11-3b are wider than the signal bandwidth, there is little reduction of the signal components and consequent loss of information. Instead of using the wavelength multiplexers 11-3a and 11-3b, it is also possible to perform the coupling using an N×1 coupling device such as a multimode interference optical device or a multistage connection of 1:1 couplers or the like.

Wavelength division multiplexed signals coupled in the transmitting section in the manner described above are transmitted over a single common optical transmission medium 11-5.

After the wavelength division multiplexed signals have been transmitted over the optical transmission medium 11-5, in the receiving section they are input into the asymmetrical Mach-Zehnder interference device 11-6 that has an optical path length difference of $c/(2n_c \Delta f)$ (wherein c is the speed of light, and $n_c$ is the effective refractive index of the optical line). Here, each signal is delayed by the time 1/(2Δf) by one optical line, and is coupled with another non-delayed signal, and these are then divided into signals for odd-numbered channels and signals for even-numbered channels. At this time, the phase shifter 11-7 is adjusted such that the optical signal wavelength of one of either the odd-numbered channels or the even-numbered channels matches the peak of the transmitted spectrum of the asymmetrical Mach-Zehnder interference device 11-6. At this time, if the wavelength dependency of the effective refractive index of the optical line is small, the optical signal wavelengths of all the odd-numbered channels match the peak of the transmitted spectrum of the asymmetrical Mach-Zehnder interference device 11-6 at the signal output terminals for the odd-numbered channels. Moreover, the optical signal wavelengths of all the even-numbered channels match the peak of the transmitted spectrum of the asymmetrical Mach-Zehnder interference device 11-6 at the signal output terminals for the even-numbered channels. Furthermore, if the asymmetrical Mach-Zehnder interference device 11-6 is formed, for example, by a semiconductor, glass, or dielectric optical waveguide, it is known that the optical path length difference of the asymmetrical Mach-Zehnder interference device 11-6 is temperature dependant. When the optical path length difference of the asymmetrical Mach-Zehnder interference device 11-6 is temperature dependant, it is also possible to control the temperature of the asymmetrical Mach-Zehnder interference device 11-6 such that the optical signal wavelength of one of either the odd-numbered channels or the even-numbered channels matches the peak of the transmitted spectrum of the asymmetrical Mach-Zehnder interference device 11-6. In this case, the phase shifter 11-7 is unnecessary. Moreover, if the accuracy with which the dimensions of the asymmetrical Mach-Zehnder interference device 11-6 have been manufactured is sufficiently high, it is possible to accurately control the optical path length difference such that the optical signal wavelength of one of either the odd-numbered channels or the even-numbered channels matches the peak of the transmitted spectrum of the asymmetrical Mach-Zehnder interference device 11-6. As a result, the phase shifter 11-7 is unnecessary.

The wavelength demultiplexer 11-8a for odd-numbered channels at the optical frequency spacings 2Δf is formed by wavelength filters, and each wavelength filter selects and transmits the wavelength of the desired odd-numbered channel from the output signals of the asymmetrical Mach-Zehnder interference device 11-6. The signals for the odd-numbered channels are separated into the respective wavelengths by the wavelength demultiplexer 11-8a. Because the optical frequency spacings 2Δf of the wavelength demultiplexer 11-8a is wider than the signal bandwidth, there is little reduction of desired signal components and subsequent loss of information. In addition, because of the characteristics of the wavelength demultiplexer 11-8a, signals of odd-numbered channels other than the desired signal can be removed.

Furthermore, taking the signal with the shortest delay as a reference, the optical time gate switches $11\text{-}9_1$ to $11\text{-}9_N$ extract signals in the time 1/(2Δf) to T (wherein T is the period of one bit) from the signals output from respective terminals of the wavelength demultiplexers 11-8a and 11-8b.

All of the signal components of the even-numbered channels are cancelled out (the details of this operation will be described below) in the outputs of the odd-numbered channels by the asymmetrical Mach-Zehnder interference device 11-6 and the optical time gate switches $11\text{-}9_1, 11\text{-}9_3, \ldots, 11\text{-}9_{N-1}$. Therefore, as a result of combining with the wavelength demultiplexer 11-8a, only signals of a single wavelength of the odd-numbered channels are extracted.

The signals input into the wavelength demultiplexer 11-8b of the even-numbered channels also undergo wavelength separation in the same way as those of the odd-numbered channels.

The signals separated into the respective wavelengths are received by the optical receivers $11\text{-}10_1$ to $11\text{-}10_N$ for the optical signals of the respective wavelengths $\lambda_1$ to $\lambda_N$, thereby enabling dense WDM optical transmission to be achieved.

In FIG. 11, optical time gate switches are used for the time gates, however, more specifically, optical switches are used that use a non-linear optical effect or by ones that use electroabsorption modulators or Mach-Zehnder intensity modulators as switches. Alternatively, electrical time gate switches are also possible, for example, by employing a method in which, after optical signals have been converted into electrical signals in the optical receiving circuit, the decision timing of a decision circuit is adjusted and the voltage of a specific time is detected as the time gate.

Figure 12:
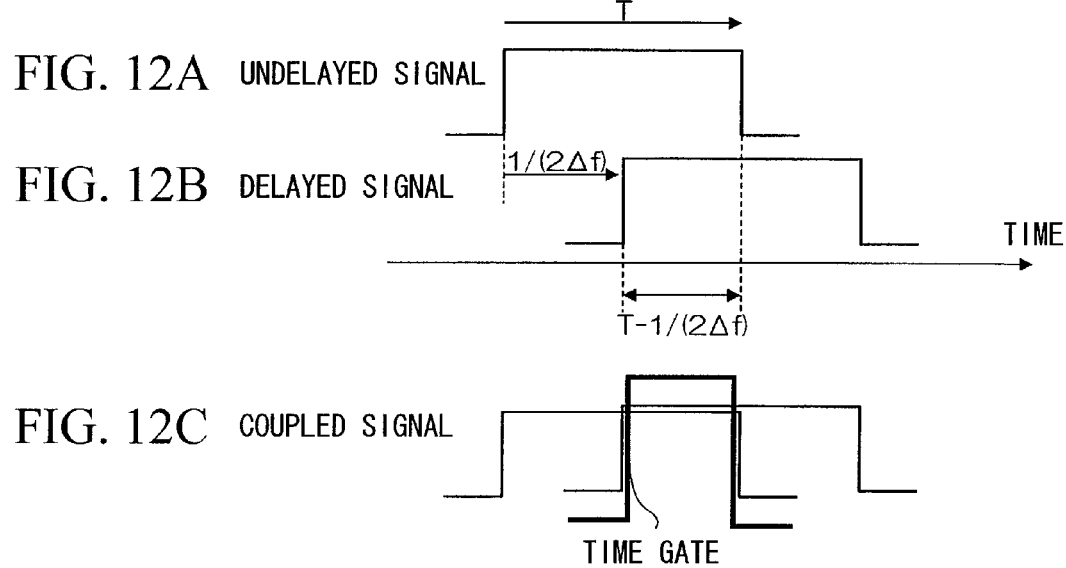
FIG. 12A to 12C are waveform diagrams for explaining the operation of the structure shown in FIG. 11.

A description will now be given using FIGS. 12A to 12C of the operation of the asymmetrical Mach-Zehnder interference device 11-6 and the optical time gate switches 11-9$_1$ to 11-9$_N$. Looking at one particular bit signal, as shown in FIGS. 12A to 12C, the asymmetrical Mach-Zehnder interference device 11-6 couples a signal that has not been delayed (FIG. 12A) with a signal that has been delayed by the time 1/(2Δf) by the optical delay line (FIG. 12B) to generate an output signal of the asymmetrical Mach-Zehnder interference device 11-6 (FIG. 12C). As can be understood from FIG. 12C, only the time portion from 1/(2Δf) to T becomes the interference signal of the signal of the particular bit. Accordingly, by extracting the signal of the time 1/(2Δf) to T using an optical time gate switch having the width T−1/(2Δf), it is possible to extract only the interference signal component of the signal of the particular bit.

If the phase shifter 11-7 is also adjusted such that the optical signal wavelengths of the odd-numbered channels match the peak of the transmitted spectrum of the asymmetrical Mach-Zehnder interference device 11-6, then the optical phases of the delayed and non-delayed signals of the odd-numbered channels match and the output signals of the asymmetrical Mach-Zehnder interference device 11-6 become the sum of the delayed and non-delayed signals. However, because in the optical signal wavelength of the even-numbered channels that are separated by the amount Δf from the odd-numbered channels, the phase difference is shifted by the amount π due to the optical path length difference c/(2n$_c$Δf), the signals interfere so that they cancel themselves out. Accordingly, the even-numbered channel components disappear in the interference signal components.

Figure 13:
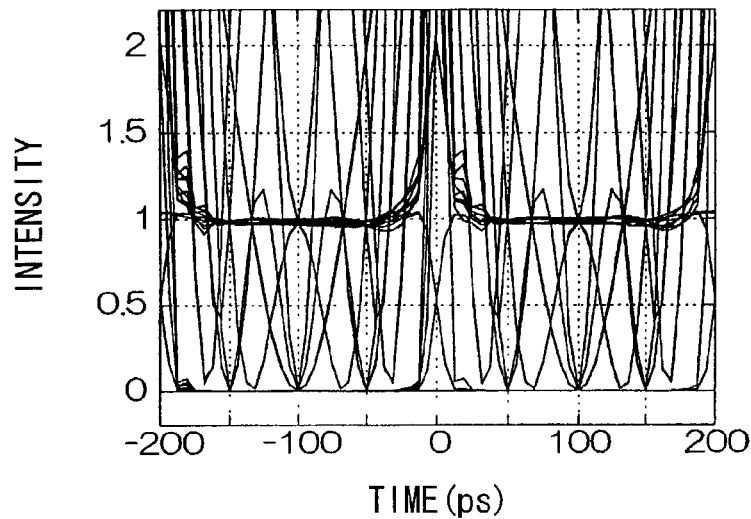
FIG. 13 is an eye diagram (i.e. before the asymmetrical Mach-Zehnder interference device 11-6) showing a simulation result according to the structure shown in FIG. 11.
Figure 14:
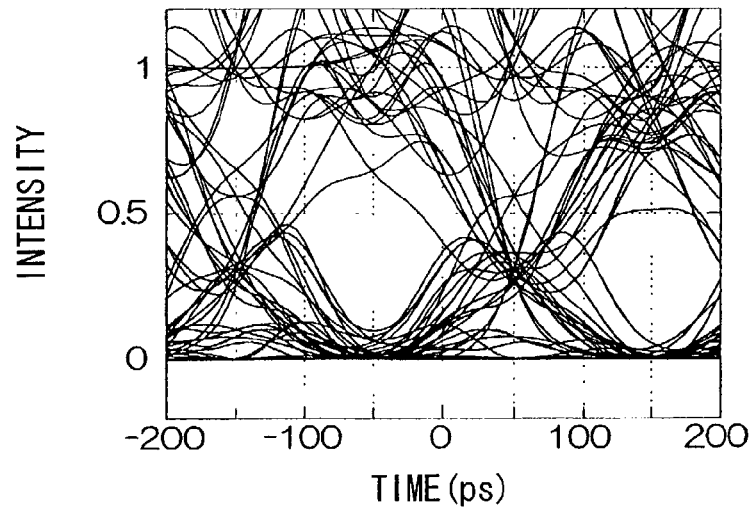
FIG. 14 is an eye diagram (i.e. before any one of the optical time gate switches $11\text{-}9_1$ to $11\text{-}9_4$) showing a simulation result according to the structure shown in FIG. 11.
Figure 15:
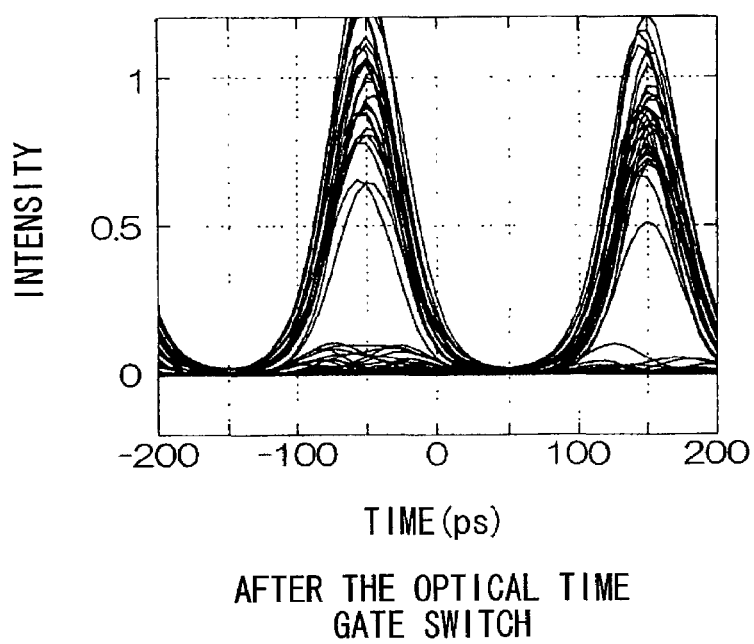
FIG. 15 is an eye diagram (i.e. after any one of the optical time gate switches $11\text{-}9_1$ to $11\text{-}9_4$) showing a simulation result according to the structure shown in FIG. 11.
Figure 16:
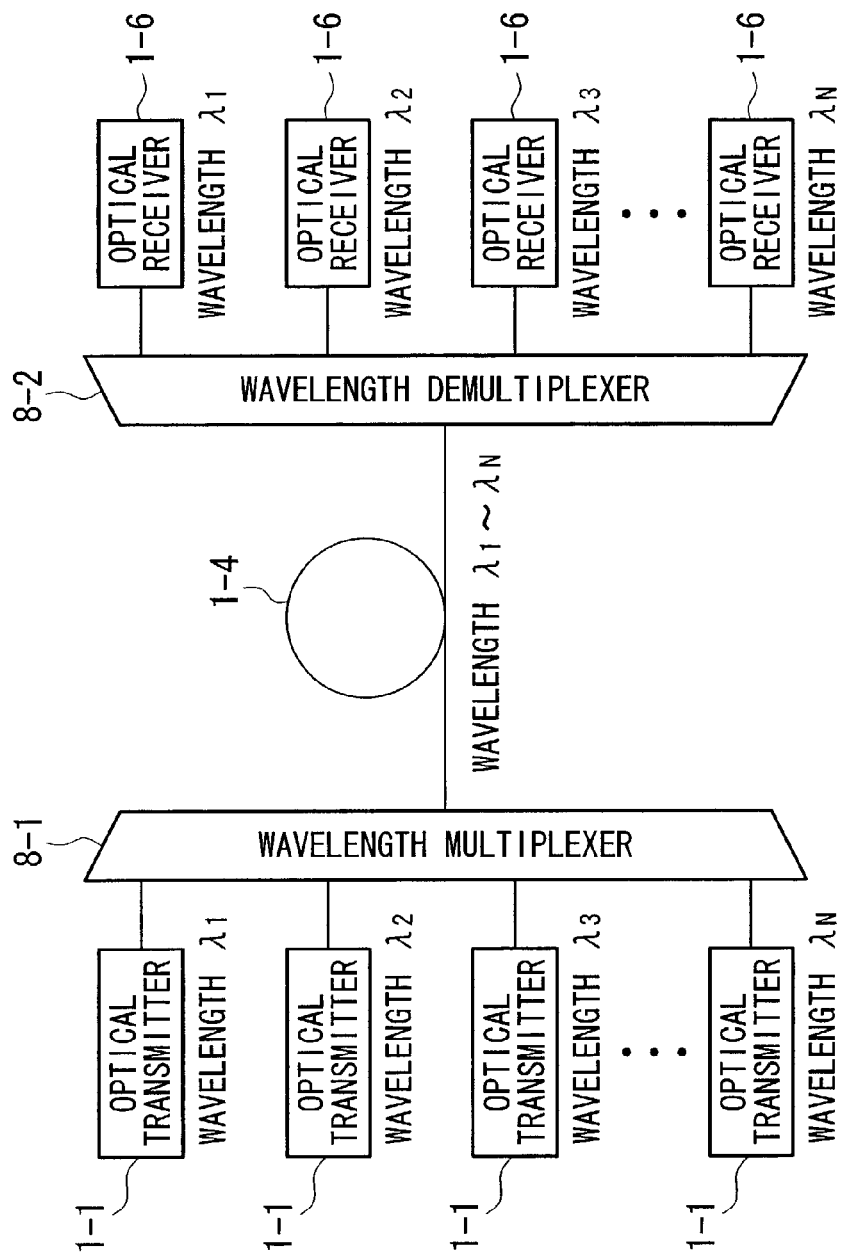
FIG. 16 is a block diagram showing the structure of a conventional WDM optical transmission system.

FIGS. 13 to 15 show the results of simulations using the structure of the present embodiment. The optical frequency (wavelength) spacing is taken as 5 [GHz], the bit rate as 5 [Gb/s], and the number of channels N=4. The spectral efficiency is 1. Eye diagrams of before the asymmetrical Mach-Zehnder interference device 11-6 (FIG. 13), before any one of the optical time gate switches 11-9$_1$ to 11-9$_4$ (FIG. 14), and after any one of the optical time gate switches 11-9$_1$ to 11-9$_4$ (FIG. 15) are shown. It can be seen that a sufficient eye diagram is opened after the optical time gate switches 11-9$_1$ to 11-9$_4$.

Thus, a WDM optical transmission system that has excellent spectral efficiency is achieved by the present embodiment.

What is claimed is:

1. A wavelength division multiplexing (WDM) optical transmission system comprising:
an optical transmitting section having an optical transmitter that generates N wave (wherein N is an integer of 2 or greater) optical signals with an optical frequency spacing Δf [Hz] and modulated by a modulation bit rate B [bit/s] (wherein B/Δf≦1 [bit/s/Hz]) using a modulation device, and having a coupler that couples the optical signals;
an optical receiving section provided with an optical discrete Fourier transform (DFT) circuit that performs a DFT on wavelength division multiplexed signals transmitted from the optical transmitting section at a sampling frequency Δf [Hz] that is equal to the optical frequency spacing and separates the wavelength division multiplexed signals into signal components of each optical frequency; and
a bit phase adjustor that makes bit phases of respective wavelength division multiplexed signals synchronous at an input terminal of the optical DFT circuit.

2. The WDM optical transmission system according to claim 1, wherein the optical DFT circuit is provided with:
a divider that divides input wavelength division multiplexed signals into N number of branches;
a delay device that delays bit phases corresponding to time k/N/Δf [s] (wherein k is an integer from 0 to N−1) for each of the divided signals;
a coupler that couples and outputs to an l numbered output terminal (wherein l is an integer from 0 to N−1) signal E$_k$ whose bit phase has been delayed by the amount k/N/Δf [s] in accordance with a phase relationship determined by $$\sum_{k=0}^{N-1} e^{-j\frac{2\pi}{N}k \cdot l} \cdot E_k;$$

and
a time gate that, taking a signal with the least delay as a reference, extracts signals of a time from (N−1)/N/Δf [s] to T[s] (wherein T is the period of one bit) from each of the coupled N number of signals.

3. The WDM optical transmission system according to claim 2, wherein the divider, the delay device, and the coupler are respectively formed by a 1×N dividing device, N number of optical delay lines whose optical path lengths each differ by ΔL=c/(Nn$_c$Δf) (wherein c is the speed of light, and n$_c$ is an effective refractive index of an optical line), and an N×N coupling device, and the 1×N dividing device, the optical delay lines, and the N×N coupling device are optically joined in this sequence.

4. The WDM optical transmission system according to claim 3, wherein the 1×N dividing device is a multi-mode interference 1×N dividing device, and the N×N coupling device is a multi-mode interference N×N coupling device.

5. The WDM optical transmission system according to claim 2, wherein, if ΔL=c/(2$^m$n$_c$Δf) (wherein c is the speed of light, and n$_c$ is an effective refractive index of an optical line) is set for an integer m whereby 2$^m$≧N, the divider, the delay device, and the coupler are formed by joining optically in multiple stages asymmetrical Mach-Zehnder interference devices whose optical path length differences are 2$^{m-1}$ΔL, 2$^{m-2}$ΔL, ..., ΔL.

6. The WDM optical transmission system according to claim 2, wherein the time gate is an optical time gate switch.

7. The WDM optical transmission system according to claim 2, wherein the time gate is an electrical time gate switch provided in the optical receiving section.

8. The WDM optical transmission system according to claim 1, wherein the bit phase adjustor controls bit phases of electrical modulation signals supplied to the modulation device in the optical transmitting section.

9. The WDM optical transmission system according to claim 1, wherein the bit phase adjustor controls an optical path length along which optical signals are transmitted on an optical transmission path provided between the optical transmitting section and the optical receiving section.

10. A WDM optical transmission system comprising:
an optical transmitting section that generates N wave (wherein N is an integer of 2 or greater) optical signals with an optical frequency spacing Δf [Hz] and modulated by a modulation bit rate B [bit/s] (wherein B/Δf≦1 [bit/s/Hz]) using a modulation device, and couples the optical signals;

an optical receiving section provided with:
an asymmetrical Mach-Zehnder interference device that takes transmitted signals from the optical transmitting section as an input and whose optical path length difference is $c/(2n_c\Delta f)$ (wherein c is the speed of light, and $n_c$ is an effective refractive index of an optical line);
a wavelength filter that selects and transmits a desired wavelength from output signals of the asymmetrical Mach-Zehnder interference device; and
a time gate that extracts signals in bit units of a time from $1/(2\Delta f)$ [s] to T[s] (wherein T is the period of one bit) from signals output by the wavelength filter; and
a bit phase adjustor that makes bit phases of respective wavelength division multiplexed signals synchronous at an input terminal of the asymmetrical Mach-Zehnder interference device.

11. The WDM optical transmission system according to claim 10, wherein the optical transmitting section is provided with: a first wavelength multiplexer that couples odd-numbered optical signals for optical signals of N waves of an optical frequency spacing Δf; a second wavelength multiplexer that couples even-numbered optical signals for the optical signals of N waves of the optical frequency spacing Δf; and a coupler that couples an output from the first wavelength multiplexer and an output from the second wavelength multiplexer.

12. The WDM optical transmission system according to claim 10, wherein the asymmetrical Mach-Zehnder interference device is provided with an in-built phase shifter.

13. The WDM optical transmission system according to claim 12, wherein the phase shifter adjusts a phase shift amount such that either an odd-numbered optical signal wavelength or an even-numbered optical signal wavelength corresponds to a peak of a transmitted spectrum of the asymmetrical Mach-Zehnder interference device.

14. The WDM optical transmission system according to claim 10, wherein the bit phase adjustor controls bit phases of electrical modulation signals supplied to the modulation device in the optical transmitting section.

15. The WDM optical transmission system according to claim 10, wherein the bit phase adjustor controls an optical path length along which optical signals are transmitted on an optical transmission path provided between the optical transmitting section and the optical receiving section.

16. The WDM optical transmission system according to claim 10, wherein the time gate is an optical time gate switch.

17. The WDM optical transmission system according to claim 10, wherein the time gate is an electrical time gate switch provided in the optical receiving section.

18. A WDM optical transmission method comprising the steps of:
N wave (wherein N is an integer of 2 or greater) optical signals with an optical frequency spacing Δf [Hz] and modulated by a modulation bit rate B [bit/s] (wherein B/Δf≦1 [bit/s/Hz]) using a modulation device are generated, and the optical signals are coupled and transmitted; and
the transmitted optical signals are received using an optical DFT circuit that performs a DFT at a sampling frequency Δf [Hz] that is equal to the optical frequency spacing and separates the transmitted optical signals into signal components of each optical frequency, and
bit phases are adjusted such that bit phases of respective wavelength division multiplexed signals at an input terminal of the optical DFT circuit are synchronized.

19. A WDM optical transmission method comprising the steps of:
N wave (wherein N is an integer of 2 or greater) optical signals with an optical frequency spacing Δf [Hz] and modulated by a modulation bit rate B [bit/s] (wherein B/Δf≦1 [bit/s/Hz]) using a modulation device are generated, and the optical signals are coupled and transmitted;
bit phase adjustment is performed such that the bit phases of the respective transmitted wavelength division multiplexed signals are synchronized, and the transmitted signals are input into an asymmetrical Mach-Zehnder interference device whose optical path length difference is $c/(2n_c\Delta f)$ (wherein c is the speed of light, and $n_c$ is an effective refractive index of an optical line);
a desired wavelength is selected from an output of the asymmetrical Mach-Zehnder interference device; and
signals of a time from $1/(2\Delta f)$ [s] to T[s] (wherein T is the period of one bit) are extracted from the selected signals in bit units and the extracted signals are output.

* * * * *